Jan. 17, 1928.  M. ZAIGER  1,656,849

TIRE CHAIN HOLDER

Filed July 9, 1926

Max Zaiger Inventor

By *[signature]*
Attorney

Patented Jan. 17, 1928.

1,656,849

UNITED STATES PATENT OFFICE.

MAX ZAIGER, OF LYNN, MASSACHUSETTS.

TIRE-CHAIN HOLDER.

Application filed July 9, 1926. Serial No. 121,456.

The objects of my invention are to provide a uniform holding pressure on tire chains, insured by a series of preferably six radial holding arms; to provide an angular holding member intermediate the spring units designed to eliminate slipping; to eliminate injury to the tire by minimizing friction of the chain thereon; to eliminate the striking of tire chains on fenders; to eliminate chain rattle and noise; and to provide the various other advantages and results made apparent from the following specification.

Figure 1:
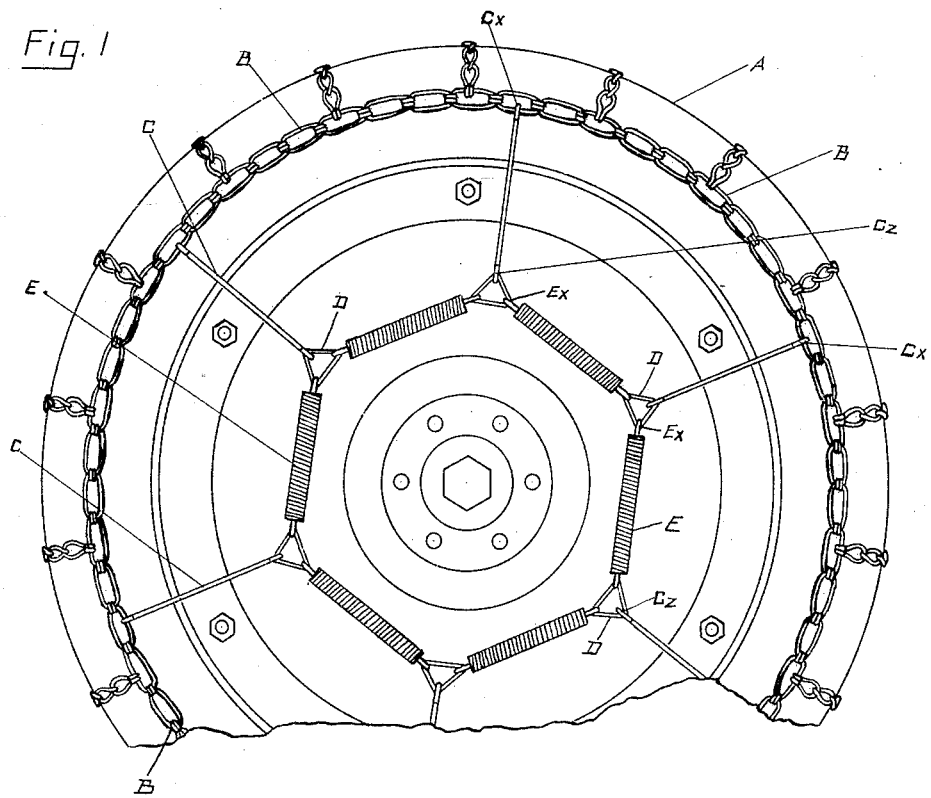
Figure 2:
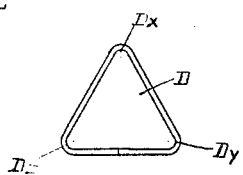

I accomplish the objects of my invention as shown in the accompanying drawings, which form a part of this specification, and in which Figure 1 shows my device affixed to the chain on an automobile tire in the position designed for use. Figure 2 shows the detail of my improved angular member.

Referring again to Figure 1, A shows the automobile tire, B shows the tire chain, C shows the radial arms extending from the angular member D to the chain B, $Cx$ shows the hook end of the arm C, $Cz$ shows the ring end of the arm C, E shows the tension springs connecting the angular members D at $Ex$.

Referring again to Figure 2, $Dx$, $Dy$, and $Dz$ show the angular portions of the member D, two of which are designed to engage the springs E at $Ex$, while the third engages a radial arm C at its ring end $Cz$.

The hooks $Cx$ are best engaged to the chain B with the end positioned away from the tire. The angular members D, function in holding the springs E and the radial arms C in fixed position eliminating movement thereof, and minimizing noise. My improved device is made in varying sizes to fit standard tire chains. When properly adjusted thereto the springs E are at tension.

I do not desire to confine myself to the specific details of construction herein described and set forth, but claim all such equivalents and variations as may well be construed to fall within the scope of the appended claim.

Having thus described my invention I claim as new and desire to secure by Letters Patent of the United States of America:

In a device for holding anti-skid chains on tires, the combination of a plurality of radial members, said radial members adapted to normally engage the anti-skid chain at uniformly spaced points about the tire, a tensioning device for the radial members comprising a plurality of springs arranged end to end between each of the several radial members, means connecting each of said radial members with the respective ends of the two adjacent springs, said means being formed with angular portions for fixing the normal set-up positions of the radial members and springs, thereby to dispose the radial members to engage the tire chain at equidistant points and position said radial members and springs so that they will have substantially the same relative angular relationship throughout thereby to prevent whipping of the tire chain and place the springs under substantially uniform tension when the device is set-up on a vehicle wheel.

In testimony whereof I affix my signature.

MAX ZAIGER.